US008538398B2

(12) United States Patent
Wilson et al.

(10) Patent No.: US 8,538,398 B2
(45) Date of Patent: *Sep. 17, 2013

(54) METHOD AND SYSTEM FOR CUSTOMIZING A USER INTERFACE OF A MOBILE DEVICE

(75) Inventors: Nicholas Bryson Wilson, Ottawa (CA); Jeffrey Emery, Nepean (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/713,663

(22) Filed: Feb. 26, 2010

(65) Prior Publication Data

US 2010/0151847 A1    Jun. 17, 2010

Related U.S. Application Data

(63) Continuation of application No. 12/169,138, filed on Jul. 8, 2008, which is a continuation of application No. 11/459,963, filed on Jul. 26, 2006, now abandoned.

(51) Int. Cl.
H04M 3/00    (2006.01)

(52) U.S. Cl.
USPC ..... 455/418; 455/557; 455/414.2; 455/432.1; 345/581; 345/594; 345/636; 345/650; 345/22; 345/23; 345/24; 345/25

(58) Field of Classification Search
USPC ............... 455/414.2, 432.1, 557; 345/581, 345/594, 636, 650, 22, 23, 24, 25
See application file for complete search history.

(56) References Cited

U.S. PATENT DOCUMENTS

| 6,119,164 | A * | 9/2000 | Basche | 709/229 |
| 6,509,913 | B2 * | 1/2003 | Martin et al. | 715/762 |
| 6,694,320 | B1 | 2/2004 | Ortiz | |
| 7,123,700 | B1 * | 10/2006 | Weaver et al. | 379/88.19 |
| 2002/0099804 | A1 * | 7/2002 | O'Connor et al. | 709/220 |
| 2002/0157091 | A1 | 10/2002 | DeMello | |
| 2003/0109251 | A1 | 6/2003 | Fujito et al. | |
| 2003/0199268 | A1 | 10/2003 | Abe | |
| 2004/0204946 | A1 | 10/2004 | Alger | |
| 2005/0050474 | A1 | 3/2005 | Bells et al. | |
| 2006/0047745 | A1 | 3/2006 | Knowles et al. | |
| 2007/0111726 | A1 * | 5/2007 | Lambert et al. | 455/432.1 |

FOREIGN PATENT DOCUMENTS

| EP | 1517258 | 3/2005 |
| EP | 1708522 | 10/2006 |
| WO | WO0186922 | 11/2001 |
| WO | 2005022375 | 3/2005 |
| WO | WO 2005/022375 | * 3/2005 |
| WO | 2005039160 | 4/2005 |

OTHER PUBLICATIONS

European Search Report for EP06117856 dated Oct. 13, 2006.

* cited by examiner

Primary Examiner — Wayne Cai
Assistant Examiner — Shantell L Heiber
(74) Attorney, Agent, or Firm — Ridout & Maybee LLP

(57) ABSTRACT

A method and system for coordinating a specific subscribed service on a mobile communication device are provided. In accordance with one embodiment, this is provided a method for coordinating a specific subscribed service on a mobile communication device, comprising: registering the mobile communication device with a node; transmitting identification information to the node, the identification information including an identifier of a device, an identifier of a vendor, an identifier of a user, and an identifier of a subscribed service; receiving information from the node in response to the transmitting; and enabling the specific subscribed service in accordance with the received information.

15 Claims, 3 Drawing Sheets

METHOD AND SYSTEM FOR CUSTOMIZING A USER INTERFACE OF A MOBILE DEVICE

RELATED APPLICATION DATA

The present application is a continuation of non-provisional U.S. patent application Ser. No. 12/169,138, filed Jul. 8, 2008, which is a continuation of non-provisional U.S. patent application Ser. No. 11/459,963, filed Jul. 26, 2006. The contents of both the above applications are incorporated herein by reference.

TECHNICAL FIELD

The present application relates to the field of customizing a user interface of a mobile device.

BACKGROUND

Mobile devices, such as personal digital assistants (PDAs), cellular telephones and smartphones, for example, provide a man machine interface (MMI) through which a user interfaces with/or controls the operation of the mobile device. A mobile device's MMI typically consists of a hardware portion and a software portion. The hardware portion consists of buttons, thumb-wheels, displays, microphones, speakers and the like, whereas the software portion typically consists of visual or audio elements which a user may interact with through the use of one or more hardware portion. A common example of a software portion of a man machine interface includes an icon. The icon is displayed on a display and is actuated by a user through the use of a button. The software portion of the MMI may also include non-interactive elements, such as logos, ring tones, menu hierarchies or screen layouts known generally as a theme.

Theme refers to attributes of the visual components or elements of the user interface that affect the look, but not the underlying meaning or semantic content, of the visual components such as colors, fonts, icon look and size, background images, and logos, among other things. Theme-able attributes are those attributes of visual elements of the user interface that can be changed or customized based on information provided to a mobile device.

Mobile device manufacturers frequently enter into arrangements with telecommunications providers (carriers) whereby the carrier sells a manufacturer's mobile devices to consumers. Carriers will typically order a volume of a given mobile device from the manufacturer for sale. A carrier may desire to have a distinct MMI to represent its corporate identity or image and to serve to differentiate mobile devices and services sold by them from those sold by other carriers. The carrier configurable MMI is typically the software portion and is commonly known as a theme. A theme includes both interactive (or functional) elements and visual (or aesthetic) elements.

The volume of mobile devices ordered by a carrier could be significant (to take advantage of volume discounts for example). As such, the carrier may not sell all of the ordered mobile devices until a lengthy period of time has past. During this time, the carrier may have changed marketing material, may have been acquired by another carrier or may have merged with another carrier. Any mobile devices which remain unsold may not comply with novel requirements resulting from the marketing change, acquisition or merger. Solutions exist wherein a mobile device's theme may be altered.

U.S. Pat. No. 6,509,913 to Bruce K. Martin Jr et al. is entitled "Configurable Man-Machine Interface" (the '913 Patent) and discloses methods which allow a network operator to configure a wireless device's man-machine interface remotely, over the air. The wireless device's man-machine interface disclosed in the '913 patent exists in relation to a browser application executing at the wireless device. The browser application requests from a network operator a configuration file which is then delivered to the wireless device and provided to the browser application. The browser application uses the configuration file to determine how to divide the wireless device's display into portions and further associate each portion of the screen with a universal resource indicator. The browser application will typically request (and possibly re-request) each of the resources indicated by the universal resource indicator and display the resource in the assigned portion of the screen.

U.S Patent Application Number US2005/0050474 to Bells et al. is entitled "Method and Data Structure for User Interface Customization" and is assigned to a common applicant, Research in Motion Ltd (the '474 application). In the '474 application is disclosed a data structure useable to theme a mobile device. The data structure is generally referred to as a UI theme file. The '474 application also discloses a UI theme manager operable at a mobile device to manage themes at the mobile device. Also disclosed in the '474 is a UI data provider system which is operable to provide UI theme files to the UI theme manager on a mobile device.

There is a need for improved system and methods whereby a mobile device's theme can be conveniently altered.

BRIEF DESCRIPTION OF THE DRAWINGS

The accompanying drawings illustrate embodiments by way of example only. In the drawings.

Similar numerals may have been used throughout the figures to represent similar components.

DETAILED DESCRIPTION OF EXAMPLE EMBODIMENTS

Embodiments provide for a system and methods wherein the user interface ('UI') of a mobile device may be themed at the latest possible moment in order to avoid costly losses arising from outdated theming or customization information contained on mobile devices which may have been held as inventory by a third party vendor.

In one aspect there is provided a method for customizing the UI of a mobile device comprising the steps of detecting an activation of the mobile device, transmitting identification information from the mobile device subsequent to the detecting, receiving UI customization information at the mobile device in response to the transmitted identification information and customizing the UI of the mobile device based on the received UI customization information.

In another aspect there is disclosed a method for supplying UI customization information comprising the steps of receiving identification information, providing UI customization information based on the received identification information and transmitting the retrieved UI customization information as a response to receiving the identification information.

In yet another aspect there is disclosed a mobile computing device, comprising a display for rendering a user interface, the user interface having visual elements displayed in accordance with a UI customization, a communication subsystem for effectuating communications, a memory storing identification information and a UI customization manager for detecting activation of the mobile computing device, transmitting the identification information, receiving UI customization information in response to the transmitted identification information, and customizing the UI of the mobile device based upon the received theme information.

In even yet another embodiment there is disclosed a user interface data provider system for customizing a user interface of a mobile device, comprising a server adapted to receive identification information from the mobile device, provide UI customization information based on the received identification information, and transmit the provided UI customization information to the mobile device in response to receiving the identification information.

In even yet another embodiment there is disclosed a method for coordinating a specific subscribed service on a mobile communication device, comprising: registering the mobile communication device with a node; transmitting identification information to the node, the identification information including an identifier of a device, an identifier of a vendor, an identifier of a user, and an identifier of a subscribed service; receiving information from the node in response to the transmitting; and enabling the specific subscribed service in accordance with the received information.

Figure 1:
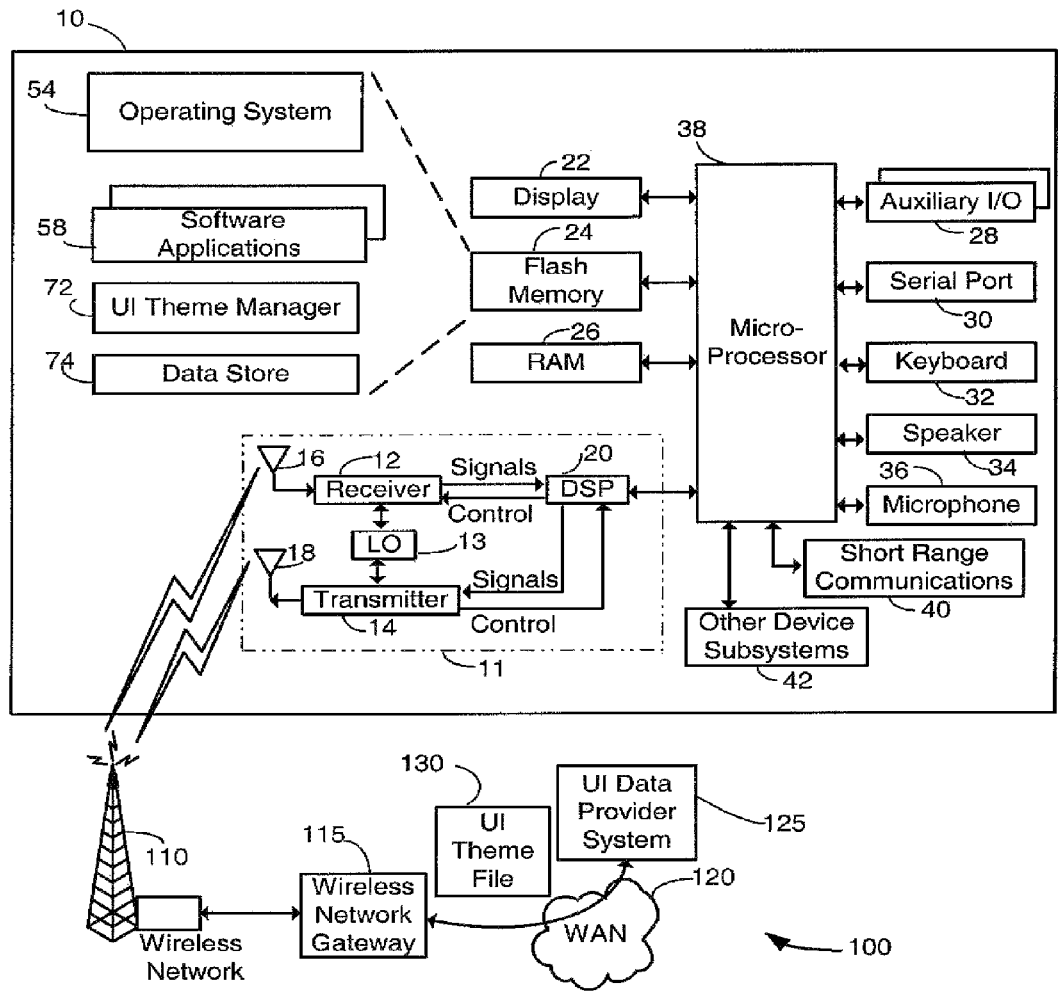
FIG. 1 is a block diagram of a mobile device and a communications system to which embodiments may be applied.

In even yet another embodiment there is disclosed a system for coordinating a specific subscribed service on mobile communication devices, comprising: a node; and a mobile communication device in communication with the node, the mobile communication device comprising a processor which is configure to (1) register with the node, (2) transmit identification information to the node, the identification information including an identifier of a device, an identifier of a vendor, an identifier of a user, and an identifier of a subscribed service, and (3) enable the specific subscribed service in accordance with information received from the node in response to the transmitted identification information Referring to FIG. 1, there is provided a block diagram of a communication system 100 and mobile device 10 in which example embodiments may be applied. The communication system 100 includes mobile devices 10 (only one of which is shown in FIG. 1), a wireless network 110 for communicating with the mobile device 10, a wireless network gateway 115 for interfacing the wireless network 110 with a Wide Area Network (WAN) 120, the WAN 120 connecting the wireless network gateway 115 with a User Interface (UI) data provider system 125.

The wireless network gateway 115 provides an interface between the wireless network 110 in which mobile device 10 operates, and the WAN 120 in which the UI data provider system 125 is configured to operate. The WAN 120 includes the Internet, a direct connection, a local area network (LAN), a wireless communication link, and any combinations thereof. In some embodiments, data available to UI data provider system 125 may be provided to devices 10 through a direct link or through a data transfer means other than through WAN 120, gateway 115 and wireless network 110.

UI data provider system 125 is a typical server which provides theming data (e.g. UI customization information) to mobile device 10, typically in the form of a UI customization file, shown in FIG. 1 as UI theme file 130. More particularly, the UI data provider system provides UI customization information to mobile device 10 that can be used by such mobile device to customize or change the theme of the user interface that is presented by mobile device 10 to a user. The theme may include a "skin" which is layout information specifying the placement of user interface fields (for example, button fields and text fields) and images. A skin may create or hide UI fields and can change semantic content. In some embodiments, the functionality that a skin invokes must generally already be present on mobile device 10 and simply be invoked by a name, however, in some embodiments, a skin description that supports advanced scripting may be used. In some embodiments, SVG is used to implement skins. In some embodiments, a theme may delegate to a skin the layout of specific user interface fields.

UI data provider system 125 is shown as a single entity in FIG. 1, but it is to be understood that multiple UI data provider systems 125 may exist.

In one embodiment, a single UI data provider system 125 exists. The single UI data provider system 125 serves UI customization data to various ones of mobile device 10 which may be on different ones of wireless network 110, implying that the various ones of mobile device 10 are associated with different vendors. In this embodiment, the single UI data provider system 125 stores various vendors' theme data, is operable to generate various vendors' theme data, or is operable to access various vendors' remote hosts to enable retrieval or generation of theme data.

In another embodiment, multiple UI data provider systems 125 exist. Each one of mobile device 10 is operable to access a specific one of UI data provider systems 125 to gain theme data. In this embodiment, a vendor may choose to point all of their ones of mobile device 10 to a particular one of UI data provider systems 125.

In the embodiment of FIG. 1, mobile device 10 is a handheld two-way mobile communication device 10 having at least data and possibly also voice communication capabilities. In an example embodiment, the device has the capability to communicate with other computer systems on the Internet. In various embodiments, mobile device 10 includes data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of mobile wireless communication devices. In the presently described embodiment, each one of mobile device 10 is configured to operate within the wireless network 110. It should be appreciated however that the present application is in no way limited to these example types of devices and may be implemented in other devices with displays.

Mobile device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem includes local oscillator(s) (LO) 13, and in some embodiments the communication subsystem and microprocessor 38 share an oscillator. As will be apparent to those skilled in the field of communications, the particular design of the communication subsystem 11 will be dependent upon the communication network in which the device is intended to operate. Communication subsystem 11 is capable of effectuating communications with external entities as is well known in the art.

Signals received by the antenna 16 through a wireless communication network 110 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 110 via the antenna 18.

Mobile device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28 (which may include a thumb-wheel or trackball, for example), serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on mobile device 10 during manufacture. Further applications may also be loaded onto mobile device 10 through the network 110, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using mobile device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads, including user interface information, to mobile device 10 other than through a wireless communication network. Such a configuration allows mobile device 10 to communicate with UI data provider system 125 without use of a wireless communication network, but through communication via the external device.

A short-range communications subsystem 40 is a further component which may provide for communication between mobile device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 110 is, in an example embodiment, a wireless packet data network, (e.g. Mobitex™, DataTAC™, GPRS, CDMA, EDGE or UMTS for example), which provides radio coverage to mobile device 10, although it could be any other type of wireless network.

Mobile device 10 includes UI customization manager software for implementing a UI customization manager, illustrated in FIG. 1 as UI theme manager 72. In one embodiment UI theme manager 72 is implemented on a JAVA runtime layer of mobile device 10. Various functions of UI theme manager 72 could, in various embodiments, be performed by operating system 54 and/or other software applications 58. The mobile device 10 also includes data store 74 for storing graphics and other files.

Figure 2:
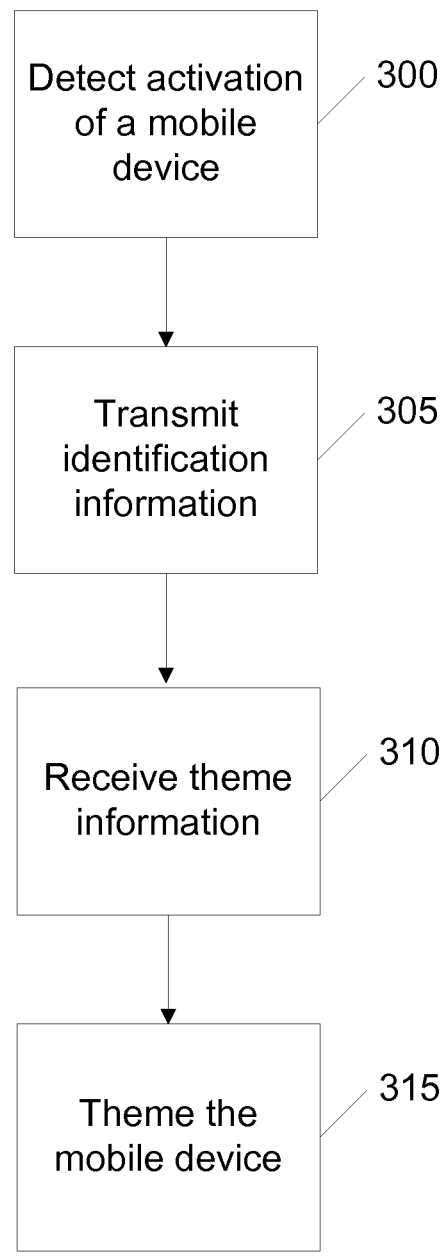
FIG. 2 is a flow diagram illustrating an embodiment of a method executable at the mobile device of FIG. 1 for theming the mobile device.

FIG. 2 discloses a flow diagram illustrating an embodiment of a method executable at mobile device 10 of FIG. 1 for just in time theming of mobile device 10. The flow diagram contains 4 steps which operate to configure the theming of mobile device 10.

In operation, the flow diagram of FIG. 2 commences theming mobile device 10 at step 300 where activation of mobile device 10 is detected. Activation comprises initial activation of mobile device 10 as well as subsequent activations of mobile device 10. An initial activation of mobile device 10 is the first time mobile device 10 is turned on and becomes capable of effectuating data communications with a wireless network and the internet. The initial activation will likely occur once a consumer has purchased mobile device 10, inserted a network identity card (such as a Subscriber Identity Module (SIM) card) if required and powered up mobile device 10 for the first time. However, initial activation could also occur through activation by a reseller or an IT administrator for example. A subsequent activation of mobile device 10 is similar to an initial activation, but it occurs after an initial activation. Activation may also require mobile device 10 to register with wireless network 110 so that mobile device 10 may effectuate data communications with other nodes, such as the internet as is well known in the art. In one embodiment, activation of the mobile device 10 may be detected by the UI theme manager 72 (FIG. 1) via a notification from Wireless Network Gateway 115 (FIG. 1).

After successful activation, mobile device 10 is capable of effectuating communications with UI data provider system 125 of FIG. 1. At step 305, mobile device 10 transmits identification information to UI data provider system 125. Identification information includes information capable of identifying mobile device 10 to UI data provider system 125. Such information could include a vendor identifier, a device identifier, subscriber identity information or class of service information.

The identification information may be stored in memory on the mobile device 10. For example, the identification information may be stored in RAM 26, flash memory 24, or in other volatile or non-volatile memory elements within the mobile device 10, such as a SIM card. In some embodiments, the identification information may be stored on the mobile device 10 during manufacturing or initial loading of the basic device software 10. Transmission of the identification information, as illustrated in step 305, may include retrieval of the identification information from memory. Transmission of the identification information may be initiated by the UI theme manager 72 in cooperation with the communication subsystem 11 (FIG. 1).

A vendor identifier is information which enables another entity to determine which vendor mobile device 10 is associated with. The vendor identifier could include a string or a number which identifies a specific vendor (such as a carrier) and is inserted onto mobile device 10, typically at the time of manufacture, typically into flash 24 or another memory system of mobile device 10. The vendor identifier allows UI data provider system 125 to know which vendor maintains rights in mobile device 10. The vendor identifier is typically inserted onto mobile device 10 to ensure customer loyalty to a vendor's network. Customer loyalty serves to offset subsidies given to a consumer at the time of purchase of mobile device 10 through periodic billing for services as is well known in the art.

A device identifier is information which enables another entity to determine which type of device mobile device 10 is. The device identifier could include a string or a number which identifies a specific model of device and is inserted onto mobile device 10, typically at the time of manufacture, typically into flash 24 or another memory system of mobile device 10. The device identifier allows UI data provider system 125 to know which type of device mobile device 10 is, allowing UI data provider system 125 to ascertain associated properties with mobile device 10, such as screen size and resolution, associated input devices, memory sizes and the like.

Subscriber identity information is information which enables another entity to determine who the user of mobile device 10 is. The subscriber identity information could include a string or a number which identifies a specific user, and can be contained on a removable card (such as a SIM card for example) or within the flash 24 of mobile device 10. Subscriber identity information allows a user to switch between multiple ones of mobile device 10 while maintaining such personal customization as a phone number.

Class of service information is information which enables another entity to determine which class of service mobile device 10 is currently subscribed to. The class of service information could be a string or a number and is configurable. The class of service information could include such details as which services a user of mobile device 10 is subscribed to or which configuration mobile device 10 is set to operate in. The class of service information for mobile device 10 is configurable in that it could change if the user of mobile device 10 chose to subscribe to different services. The class of service information for mobile device 10 could also change as a result of switching the mode of operation of mobile device 10.

Subsequent to transmitting identification information to UI data provider system 125 in step 305, theme information (e.g. UI customization information) is received at mobile device 10 from UI data provider system 125 at step 310. Theme information includes information capable of configuring mobile device 10 to use given theme information and is in the form of UI theme file 130 for example.

UI theme file 130 is a file which includes information to specify custom attributes used in various user interface elements as well as information for generating customized user elements. A UI theme file 130 contains information which enables mobile device 10 to generate a specific theme as described in U.S. Patent Application US2005/0050474.

Once received at mobile device 10, UI theme file 130 is used to establish a current theme at mobile device 10. At step 315, UI theme manager 72 processes the UI theme file 130 received at step 310 to establish the current theme of mobile device 10. In order to establish the current theme, UI theme manager 72 uses the instructions and information contained in UI theme file 130 to maintain in memory an icon/graphic image collection as well as current visual user interface attributes, possibly including a skin. Elements that are displayed on display 22 of mobile device 10 have the visual attributes specified by the current theme applied to them. Icons and other graphic images that are displayed are selected from the theme icon/graphic image collection. UI theme file 130 may also include instructions to enable or disable specific applications, altering the functionality available to a user of mobile device 10.

Figure 3:
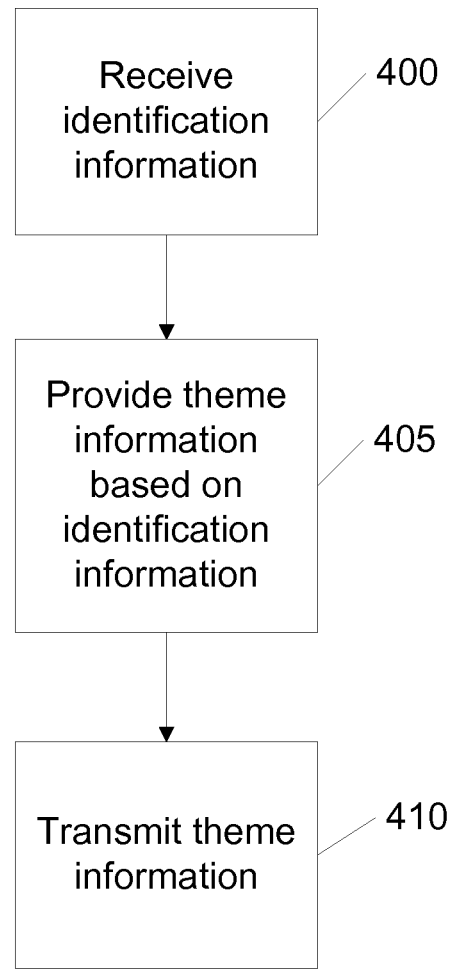
FIG. 3 is a flow diagram illustrating an embodiment of a method executable by a UI data provider system from FIG. 1 for theming a mobile device.

FIG. 3 discloses a flow diagram illustrating an embodiment of a method executable at UI data provider system 125 of FIG. 1 for just in time theming of mobile device 10. The flow diagram contains 3 steps which operate to enable the theming of mobile device 10 through customization of the UI of the mobile device 10.

In operation, the flow diagram of FIG. 3 commences at step 400 where UI data provider system 125 receives identification information. Received identification information is from mobile device 10, as transmitted in step 305 of FIG. 2.

The received identification information provides UI data provider system 125 with the requisite information to identify the vendor and/or device type and/or user and/or service class of mobile device 10. Using this information, UI data provider system 125 is capable of providing the appropriate theme information for mobile device 10 at step 405. Providing may involve retrieving theme information from a data store local to UI data provider system 125, generating theme information at UI data provider system 125 or requesting and receiving at UI data provider system 125 theme information from a remote host for example. Using the received identification information as an index to identify and/or locate the appropriate theme information associated with mobile device 10, UI data provider system 125 is operable to provide the appropriate theme information. UI data provider system 125 may compile the theme information into UI theme file 130 for example, which has the proper theme information associated with the identification information received from mobile device 10 at step 400.

It is to be understood that at step 405 UI data provider system 125 is responsible for either generating or retrieving the theme information to be transmitted at step 410. In either event, UI data provider system 125 uses the identification information received at step 400 to determine the correct theme information.

As an example, UI data provider system 125 receives at step 400 identification information containing vendor information, device information, subscriber identity information and class of service information. Using the received identification information, UI data provider system 125 selects elements for inclusion in theme information. For example, the following elements are selected; a specific vendor logo and skin based on the vendor information, a specific colour depth and colour scheme based on the device information, a specific set of user preferences based on the subscriber identity information and enables a specific set of applications based on the class of service information. UI data provider system 125 amalgamates the selected elements into theme information and possibly compiles the theme information into UI theme file 130.

As another example, UI data provider system 125 selects pre-configured theme information (or UI theme file 130) from a data store based on the identification information received at step 400.

At step 410, UI data provider system 125 transmits the theme information retrieved at step 405 to mobile device 10. The theme information transmitted to mobile device 10 enables the theming of mobile device 10.

As another example, UI data provider system 125 stores the identification information received at step 400. In this example, UI data provider system 125 is operable to execute multiple iterations of steps 405 and 410 based on one or more sets of identification information received in one or more iteration of step 400. Based on the identification information received in an iteration of step 400, UI data provider 125 will check for updated theme information on a regular basis. Should updated theme information exist for mobile device 10, UI data provider system 125 retrieves the appropriate theme information, as in step 405, and transmits the theme information to mobile device 10, as in step 410. In this regard, UI data provider system 125 will push updated theme information to mobile device 10 without the need for mobile device 10 to resubmit its identification information.

The present application includes description of a number of embodiments. These are not intended to be limiting examples. It will be obvious to one skilled in the art that variations and modifications may be made without departing from the scope of the appended claims.

The invention claimed is:

1. A method for customizing a user interface of a mobile device comprising:
    detecting an activation of the mobile device;
    transmitting identification information from the mobile device subsequent to the detecting, the identification information including at least one of vendor identification, device identification, subscriber identity information and class of service information;
    receiving first user interface customization information at the mobile device in response to the transmitted identification information;
    customizing the user interface of the mobile device based on the first user interface customization information, thereby forming a first customized user interface;
    establishing the first customized user interface as a current customized user interface configuration;
    receiving unsolicited second user interface customization information at the mobile device, the second user interface customization information associated with the identification information;
    customizing the user interface of the mobile device based on the second user interface customization information, thereby forming a second customized user interface; and
    establishing the second customized user interface as an updated customized user interface configuration.

2. The method of claim 1 wherein the activation is an initial activation of the mobile device.

3. The method of claim 1 wherein the first user interface customization information is a user interface theme file.

4. The method of claim 1 further comprising customizing the user interface of the mobile device based on default user interface customizing information prior to the step of detecting the activation.

5. The method of claim 1 wherein the receiving the first user interface customization information comprises receiving the first user interface customization information over the air.

6. The method of claim 1 further comprising, subsequent to transmitting identification information and prior to the receiving first user interface customization information, supplying the first user interface customization information comprising:
    receiving the identification information;
    providing the first user interface customization information based on the received identification information; and
    transmitting the first user interface customization information as a response to receiving the identification information.

7. The method of claim 6 wherein the identification information comprises a vendor identification.

8. The method of claim 6 wherein the identification information comprises a device identification.

9. The method of claim 6 wherein the providing includes retrieving the first user interface customization information from a store.

10. The method of claim 9 wherein the store is on a remote server.

11. The method of claim 6 wherein the first user interface customization information is a user interface theme file.

12. The method of claim 6 further comprising receiving the first user interface customization information prior to the receiving the identification information.

13. The method of claim 6 wherein the receiving the identification information comprises receiving the identification information over the air.

14. The method of claim 6 wherein subsequent to the transmitting the first user interface customization information, the method further comprises:
    storing the identification information;
    detecting an update to associated user interface customization information for the received identification information;
    generating the second user interface customization information based on the update; and
    transmitting the second user interface customization information.

15. A mobile computing device, comprising:
    a display for rendering a user interface, the user interface having visual elements displayed in accordance with a user interface customization;
    a communication subsystem for effectuating communications;
    a memory storing identification information; and
    a user interface customization manager adapted to:
        detect activation of the mobile computing device,
        transmit the identification information, the identification information including at least one of vendor identification, device identification, subscriber identity information and class of service information,
        receive first user interface customization information,
        customize the user interface of the mobile device based upon the first user interface customization information, thereby forming a first customized user interface and
        establish the first customized user interface as a current customized user interface configuration, receive unsolicited second user interface customization information, the second user interface customization information associated with the identification information, customize the user interface of the mobile device based on the second user interface customization information, thereby forming a second customized user interface and establish the second customized user interface as an updated customized user interface configuration.

* * * * *